US008868035B2

(12) United States Patent
Tiwari

(10) Patent No.: US 8,868,035 B2
(45) Date of Patent: Oct. 21, 2014

(54) METHODS FOR ACCESS CONTROL WITH A BACK-OFF TIMER MAINTAINED FOR LOW PRIORITY DEVICES OR MACHINE TYPE COMMUNICATION (MTC) DEVICES, AND APPARATUSES USING THE SAME

(75) Inventor: Kundan Tiwari, Taoyuan County (TW)

(73) Assignee: HTC Corporation, Taoyuan (TW)

(*) Notice: Subject to any disclaimer, the term of this patent is extended or adjusted under 35 U.S.C. 154(b) by 263 days.

(21) Appl. No.: 13/335,013

(22) Filed: Dec. 22, 2011

(65) Prior Publication Data

US 2012/0171993 A1 Jul. 5, 2012

Related U.S. Application Data

(60) Provisional application No. 61/428,320, filed on Dec. 30, 2010, provisional application No. 61/440,402, filed on Feb. 8, 2011.

(51) Int. Cl.
*H04W 12/08* (2009.01)

(52) U.S. Cl.
USPC ........ 455/410; 455/418; 455/435.3; 455/443; 455/435.2; 455/445; 455/525; 455/444; 455/435.1; 455/464

(58) Field of Classification Search
USPC ........ 455/410, 453.1–453.3, 414.1, 445, 418, 455/517, 525
See application file for complete search history.

(56) References Cited

U.S. PATENT DOCUMENTS

| | | | |
|---|---|---|---|
| 7,715,868 B2 * | 5/2010 | Zhao et al. | 455/550.1 |
| 8,331,764 B2 | 12/2012 | Myokan | |
| 8,463,269 B2 * | 6/2013 | Mubarek et al. | 455/435.3 |
| 2008/0056226 A1 | 3/2008 | Zhao et al. | |
| 2008/0153486 A1 | 6/2008 | Ramkull et al. | |
| 2010/0216465 A1 | 8/2010 | Mubarek et al. | |
| 2012/0155257 A1 | 6/2012 | Tiwari | |
| 2012/0170453 A1 | 7/2012 | Tiwari | |

FOREIGN PATENT DOCUMENTS

CN 100334894 C 8/2007

(Continued)

OTHER PUBLICATIONS

3GPP TS 24.008 V10.1.0 (Dec. 2010); 3rd Generation Partnership Project; Technical Specification Group Core Netowrk and Terminals; Mobile radio interface Layer 3 specification; Core network protocols; Stage 3 (Release 10); 8 pages.
HTC, "Handling of periodic RAU timer, mobile reachable timer and MM back-off timer," 3GPP TSG-CT WG1 Meeting #68, Nov. 15-19, 2010, 15 pages, C1-104799.

(Continued)

*Primary Examiner* — Michael T Vu
(74) *Attorney, Agent, or Firm* — Birch, Stewart, Kolasch & Birch, LLP

(57) ABSTRACT

A mobile communication device configured for Machine Type Communication (MTC) is provided. In the mobile communication device, a wireless module performs wireless transmissions and receptions to and from a service network, and a controller module starts a back-off timer in response to adding a Public Land Mobile Network (PLMN) identity to a forbidden PLMN list or in response to setting a subscriber identity card coupled to the mobile communication device as invalid. Also, the controller module further forbids any access to the service network via the wireless module until the back-off timer expires, and, before the back-off timer expires, stores an amount of a remaining time for the back-off timer to expire in response to a power-off of the mobile communication device or in response to detaching from the service network via the wireless module.

8 Claims, 13 Drawing Sheets

(56) References Cited

FOREIGN PATENT DOCUMENTS

| CN | 101584239 A | 11/2009 |
|---|---|---|
| JP | 05-282214 A | 10/1993 |
| JP | 2007-189374 A | 7/2007 |
| JP | 2009-135804 A | 6/2009 |
| JP | 2010-271967 A | 12/2010 |
| TW | 201228429 A1 | 7/2012 |
| TW | 201228440 A1 | 7/2012 |
| WO | WO 2004/043092 A1 | 5/2004 |
| WO | WO 2008/077682 A1 | 7/2008 |

OTHER PUBLICATIONS

SA2, "LS on maintaining reject conditions during power-off," 3GPP TSG CT WG1 Meeting #68, Nov. 15-19, 2010, 1 page, C1-104508.

3GPP TSG-CT WG1 Meeting #67 Barcelona, Spain, Oct. 11-15, 2010; C1-104213; Nokia Siemens Networks et al: "Modified EMM Cause values for NIMTC", p. 3.

3GPP TSG-CT WG1 Meeting #67 Barcelona, Spain, Oct. 11-15, 2010; C1-104433; Nokia Siemens Networks et al: "Modified GMM Cause values for NIMTC"; pp. 3, 5.

* cited by examiner

METHODS FOR ACCESS CONTROL WITH A BACK-OFF TIMER MAINTAINED FOR LOW PRIORITY DEVICES OR MACHINE TYPE COMMUNICATION (MTC) DEVICES, AND APPARATUSES USING THE SAME

CROSS REFERENCE TO RELATED APPLICATIONS

This Application claims priority of U.S. Provisional Application No. 61/428,320, filed on Dec. 30, 2010, and the entirety of which is incorporated by reference herein. This Application also claims priority of U.S. Provisional Application No. 61/440,402, filed on Feb. 8, 2011, and the entirety of which is incorporated by reference herein.

BACKGROUND OF THE INVENTION

1. Field of the Invention

The invention generally relates to access control techniques, and more particularly, to methods for access control with a back-off timer for low priority devices or Machine Type Communication (MTC) devices, and apparatuses using the same.

2. Description of the Related Art

For a long time, various machines have been provided to make our lives more convenient in every way. Generally, machines, nowadays, are equipped with computing processors and software to accommodate us with more intelligence-based services. With the advancement of wireless communications, Machine Type Communication (MTC) has been developed to enable communications between remote machines for exchanging information and operating without human interaction. Especially for critical public infrastructures, such as water treatment facilities or bridges, MTC sensors may be employed to monitor the operation statuses of facilities and report measurement results back to control centers via wireless communication networks, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced technology, and others.

Take the LTE technology in compliance with the 3GPP TS 23.060 specification, v10.1.0 (referred to herein as the TS 23.060 specification) and the 3GPP TS 24.008 specification, v10.1.0 (referred to herein as the 24.008 specification) as an example. A low priority indicator or MTC indicator is defined for indicating that a Mobile Station (MS) is tolerant to delays. An ME may be configured for MTC during manufacturing, and/or when accessing the service network, by Open Mobile Alliance (OMA) Device Management (DM) and/or Subscriber Identity Module/Universal Subscriber Identity Module (SIM/USIM) Over-The-Air (OTA). For an MS configured for MTC or configured as a low priority device, a back-off timer, T3245, is started with a random value in the range from 24 hrs to 48 hrs, when a PLMN identity is added to the "forbidden PLMN list" or the "forbidden PLMN for GPRS service" list, or when the SIM/USIM is set as invalid for GPRS or non-GPRS services. The situation may occur when the service network associated with the PLMN identity is congested or overloaded and wishes to decrease the communication traffic. Once the back-off timer is started, the MS is forbidden to access the service network associated with the PLMN identity until the back-off timer expires, and when the back-off timer expires, the MS erases the "forbidden PLMN list" and the "forbidden PLMN for GPRS service" list and sets the SIM/USIM as valid for GPRS or non-GPRS services, so that it may access the service network associated with the PLMN identity again.

BRIEF SUMMARY OF THE INVENTION

In one aspect of the invention, a mobile communication device configured for MTC or configured as a low priority device is provided. The mobile communication device comprises a wireless module and a controller module. The wireless module performs wireless transmissions and receptions to and from a service network. The controller module starts a back-off timer in response to adding a PLMN identity to a forbidden PLMN list or in response to setting a subscriber identity card coupled to the mobile communication device as invalid, and forbids any access to the service network via the wireless module until the back-off timer expires. Also, before the back-off timer expires, the controller module stores a remaining time for the back-off timer to expire in response to a power-off of the mobile communication device or in response to detaching from the service network via the wireless module.

Correspondingly, a method for access control with a back-off timer maintained by a mobile communication device configured for MTC or configured as a low priority device and wirelessly connected to a service network is provided. The method comprises the steps of starting the back-off timer in response to adding a PLMN identity to the forbidden PLMN list or in response to setting a subscriber identity card coupled to the mobile communication device as invalid, forbidding any access to the service network until the back-off timer expires, and storing a remaining time for the back-off timer to expire in response to a power-off of the mobile communication device or in response to detaching from the service network, before the back-off timer expires.

In another aspect of the invention, a mobile communication device, configured for MTC or configured as a low priority device is provided. The mobile communication device comprises a wireless module and a controller module. The wireless module performs wireless transmissions and receptions to and from a service network. The controller module starts a back-off timer in response to adding a PLMN identity to a forbidden PLMN list or in response to setting a subscriber identity card coupled to the mobile communication device as invalid, and forbids any access to the service network via the wireless module until the back-off timer expires, wherein the back-off timer is kept running in response to a the controller module being switched-off or in response to the controller module detaching from the service network via the wireless module, before the back-off timer expires.

Correspondingly, a method for access control with a back-off timer maintained by a mobile communication device configured for MTC or configured as a low priority device and wirelessly connected to a service network is provided. The method comprises the steps of starting the back-off timer in response to adding a PLMN identity to a forbidden PLMN list or in response to setting a subscriber identity card coupled to the mobile communication device as invalid, forbidding any access to the service network until the back-off timer expires, and keeping the back-off timer running in response to a mobile communication function of the mobile communication device being switched off or in response to the mobile communication device detaching from the service network, before the back-off timer expires.

In yet another aspect of the invention, a mobile communication device, configured for MTC or configured as a low priority device is provided. The mobile communication device comprises a wireless module and a controller module. The wireless module performs wireless transmissions and receptions to and from a service network. The controller module starts a back-off timer in response to adding a PLMN identity to a forbidden PLMN list or in response to setting a subscriber identity card coupled to the mobile communication device as invalid, and forbids any access to the service network via the wireless module until the back-off timer expires. Also, the controller module does not store the forbidden PLMN list in response to a power-off of the mobile communication device before the back-off timer expires, or stores the forbidden PLMN list in response to a power-off of the mobile communication device before the back-off timer expires and removes the forbidden PLMN list in response to a power-on of the mobile communication device after the power-off.

Correspondingly, a method for access control with a back-off timer maintained by a mobile communication device configured for MTC or configured as a low priority device and wirelessly connected to a service network is provided. The method comprises the steps of starting the back-off timer in response to adding a PLMN identity to a forbidden PLMN list or in response to setting a subscriber identity card coupled to the mobile communication device as invalid, forbidding any access to the service network until the back-off timer expires, and not storing the forbidden PLMN list or the invalidity setting of the subscriber identity card in response to a power-off of the mobile communication device before the back-off timer expires, or storing the forbidden PLMN list or the invalidity setting of the subscriber identity card in response to a power-off of the mobile communication device before the back-off timer expires and removing the forbidden PLMN list in response to a power-on of the mobile communication device after the power-off.

Other aspects and features of the present invention will become apparent to those with ordinarily skill in the art upon review of the following descriptions of specific embodiments of apparatuses and methods for access control with a back-off timer maintained for low priority devices and MTC devices.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. Note that the 3GPP specifications described herein are used to teach the spirit of the invention, and the invention is not limited thereto.

It is noted that, according to the TS 23.060 and TS 24.008 specifications, the behavior of the MS is not specified for the case where the back-off timer, T3245, is still running when the MS is powered off or when the MS is detached from the service network. As a result, the indeterminate behavior of the MS may cause the PLMN identity, which the back-off timer starts for, to remain in the "forbidden PLMN list" or the "forbidden PLMN for GPRS service" list after the MS is powered on later, and thus making the MS unable to obtain normal services as it should be. Alternatively, the indeterminate behavior of the MS may cause the "forbidden PLMN list" or the "forbidden PLMN for GPRS service" list to be reset when the MS is powered off, even if the back-off timer has not yet expired, and the MS may request for access of the service network associated with the PLMN identity right after being powered on, and thus creating communication traffic for the congested or overloaded service network associated with the PLMN identity.

Figure 1:
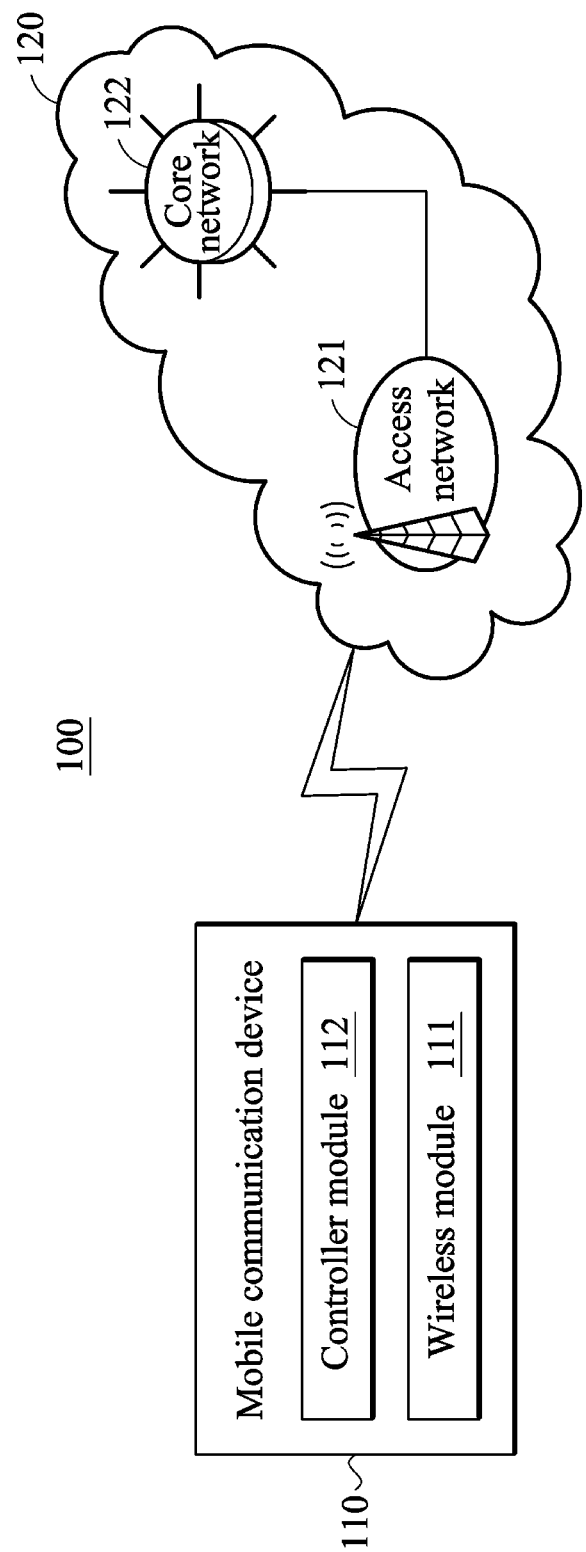
FIG. 1 is a block diagram illustrating a mobile communication environment according to an embodiment of the invention.

In order to solve the aforementioned problems, the invention provides apparatuses and methods for handling forbidden PLMN lists for low priority devices or MTC devices. FIG. 1 is a block diagram illustrating a mobile communication environment according to an embodiment of the invention. In the mobile communication environment 100, the mobile communication device 110 is configured for MTC or configured as a low priority device, and is wirelessly connected to the service network 120 for obtaining wireless services. The service network 120 may comprise an access network 121 and a core network 122, wherein the access network 121 may be a Universal Terrestrial Radio Access Network (UTRAN) in the WCDMA technology or an E-UTRAN (Evolved-UTRAN) in the LTE/LTE-Advanced technology, and the core network 122 may be a GPRS core in the WCDMA technology or an Evolved Packet Core (EPC) in the LTE/LTE-Advanced technology. The mobile communication device 110 comprises a wireless module 111 for performing the functionality of wireless transmissions and receptions to and from the service network 120, and a controller module 112 for controlling the operation of the wireless module 111 and other functional components, such as a display unit and/or keypad serving as the MMI (man-machine interface), a storage unit storing the program codes of applications or communication protocols, or others. To further clarify, the wireless module 111 may be a radio frequency (RF) unit, and the controller module 112 may be a general-purpose processor or a micro-control unit (MCU) of a baseband unit. The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the mobile communication system, wherein the radio frequency may be 900 MHz, 1900 MHz, or 2100 MHz utilized in WCDMA systems, or may be 900 MHz, 2100 MHz, or 2.6 GHz utilized in LTE/LTE-Advanced systems, or others depending on the Radio Access Technology (RAT) in use. Although not shown, there may be a subscriber identity card, such as a Subscriber Identity Module (SIM) card or a Universal Subscriber Identity Module (USIM) card, coupled in/to the mobile communication device 110. The subscriber identity card may be coupled to the controller module 112 via a card controller (not shown) for powering the subscriber identity card with voltage levels according to requirements thereof, or may be directly coupled to the controller module 112 via an interface provided by the controller module 112.

Figure 2:
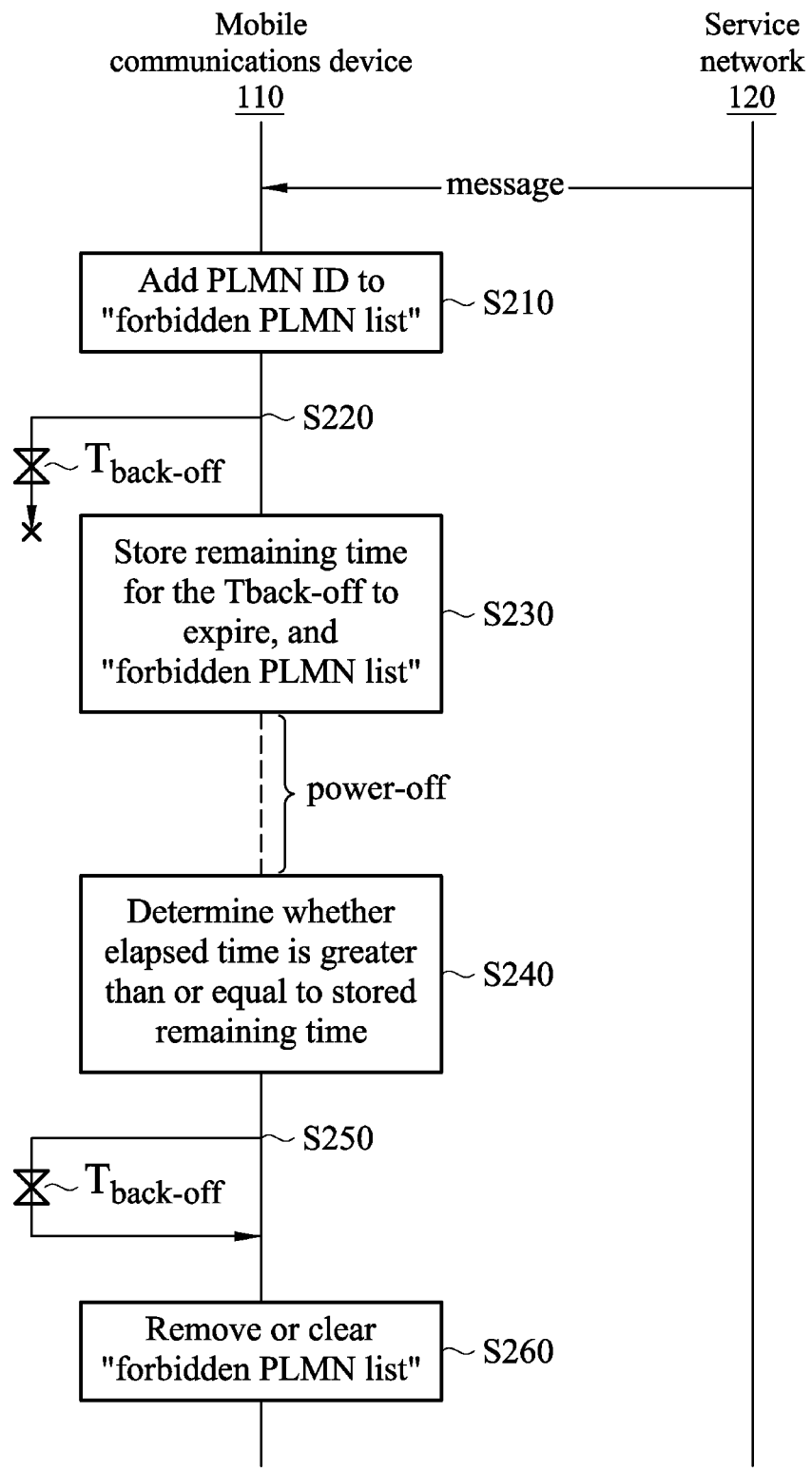
FIG. 2 is a message sequence chart illustrating the handling of the back-off timer and the "forbidden PLMN list" maintained for access control of the low priority devices or MTC devices according to an embodiment of the invention.

To be more specific, the controller module 112 controls the wireless module 111 for handling the forbidden PLMN lists. FIG. 2 is a message sequence chart illustrating the handling of the back-off timer and the "forbidden PLMN list" maintained for access control of the low priority devices or MTC devices according to an embodiment of the invention. In this embodiment, the handling of the back-off timer is triggered by the mobile communication device 110 receiving a particular message from the service network 120. This particular message may be an ATTACH REJECT message received during an attachment procedure, which contains a rejection cause indicating "PLMN not allowed", or may be a ROUTING AREA UPDATE REJECT/LOCATION UPDATING REJECT message received during a location registration procedure, which contains a rejection cause indicating "PLMN not allowed", or may be a SERVICE REJECT message received during a service request procedure, which contains a rejection cause indicating "PLMN not allowed". Alternatively, this particular message may be a DETACH REQUEST message received during a network initiated detachment procedure, which contains a detachment type of "re-attach not required" and a detachment cause indicating "PLMN not allowed". When receiving this particular message from the service network 120, the controller module 112 adds to the "forbidden PLMN list" the PLMN identity which the service network 120 belongs to (step S210). In response to the update of the "forbidden PLMN list", the controller module 112 starts the back-off timer, T3245, with a random value in the range from 24 hrs to 48 hrs since the mobile communication device 110 is configured for MTC or configured as a low priority device (step S220). Later, in response to the mobile communication device 110 being powered off before the back-off timer expires, the controller module 112 stores the amount of the remaining time for the back-off timer to expire and the "forbidden PLMN list" (step S230). Subsequently, when the mobile communication device 110 is powered on again, the controller module 112 determines whether the time elapsed from the last power-off of the mobile communication device 110 is greater than or equal to the remaining time (step S240).

In another embodiment, the amount of the remaining time for the back-off timer to expire may be stored in response to the mobile communication device 310 detaching from the service network 120, instead of in response to the mobile communication device 110 being powered off, and the controller module 112 may determine whether the time elapsed from the detachment of the mobile communication device 110 from the service network 120 is greater than or equal to the remaining time, when the mobile communication device 110 is powered on again.

As the elapsed time is less than the remaining time in this embodiment, the controller module 112 starts the back-off timer with the result of the remaining time minus the elapsed time (step S250). After that, the controller module 112 removes or clears the "forbidden PLMN list" when the back-off timer expires (step S260). In another embodiment, if the elapsed time is determined to be greater than or equal to the remaining time in the step S240, the controller module 112 does not start the back-off timer, and instead, directly removes or clears the "forbidden PLMN list". Note that, during the running period of the back-off timer, the PLMN identity which the service network 120 belongs to remains in the "forbidden PLMN list", so the mobile communication device 110 is forbidden to access the service network 120. Thus, the communication traffic to the service network 120 may be subject to control and the mobile communication device 110 may be able to obtain normal services by the proper handling of the back-off timer, T3245.

Figure 3:
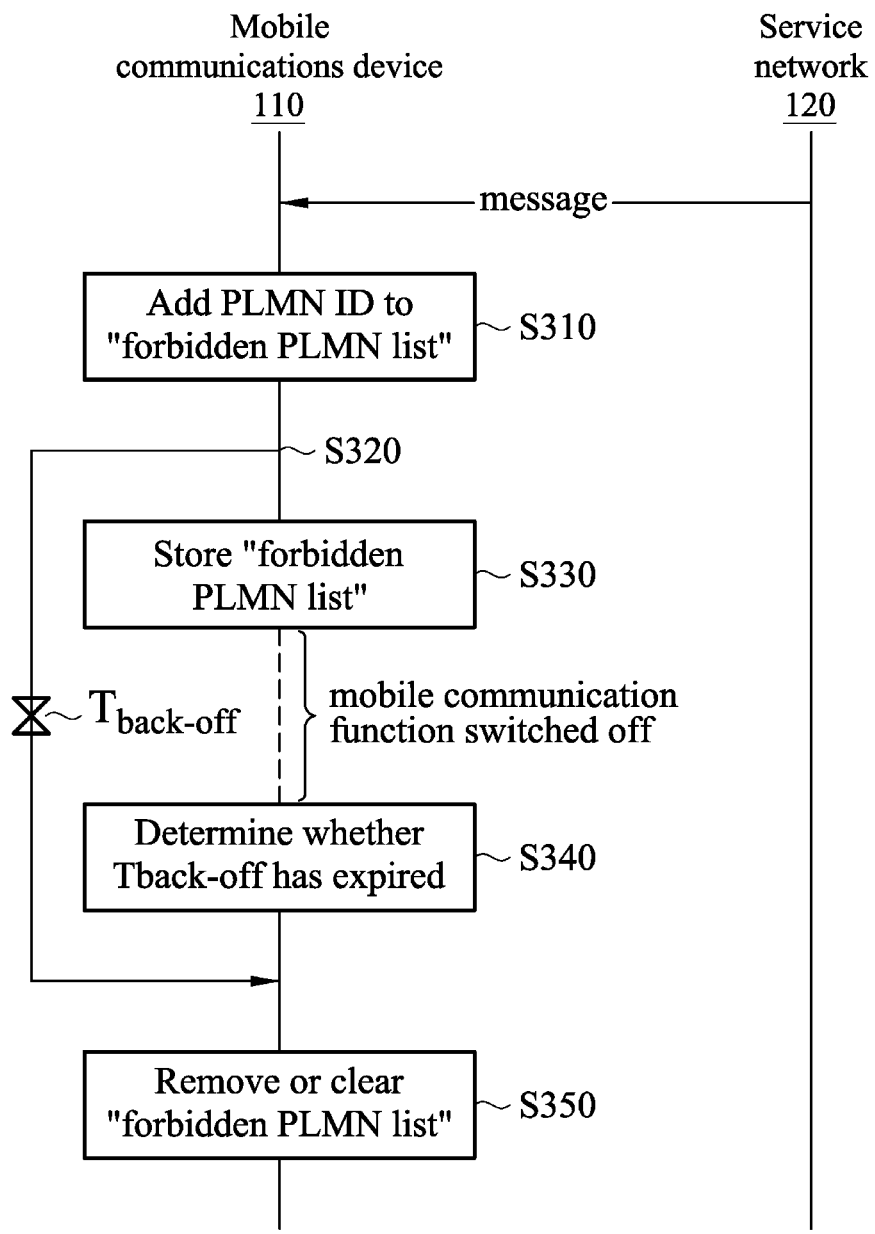
FIG. 3 is a message sequence chart illustrating the handling of the back-off timer and the "forbidden PLMN list" maintained for access control of the low priority devices or MTC devices according to another embodiment of the invention.

FIG. 3 is a message sequence chart illustrating the handling of the back-off timer and the "forbidden PLMN list" maintained for access control of the low priority devices or MTC devices according to another embodiment of the invention. Similar to FIG. 2, the handling of the back-off timer in this embodiment is triggered by the mobile communication device 110 receiving a particular message from the service network 120. This particular message may be an ATTACH REJECT message received during an attachment procedure, which contains a rejection cause indicating "PLMN not allowed", or may be a ROUTING AREA UPDATE REJECT/LOCATION UPDATING REJECT message received during a location registration procedure, which contains a rejection cause indicating "PLMN not allowed", or may be a SERVICE REJECT message received during a service request procedure, which contains a rejection cause indicating "PLMN not allowed". Alternatively, this particular message may be a DETACH REQUEST message with a detachment type of "re-attach not required" and a detachment cause indicating "PLMN not allowed" received during a network initiated detachment procedure. When receiving this particular message from the service network 120, the controller module 112 adds to the "forbidden PLMN list" the PLMN identity which the service network 120 belongs to (step S310). In response to the update of the "forbidden PLMN list", the controller module 112 starts the back-off timer, T3245, with a random value in the range from 24 hrs to 48 hrs since the mobile communication device 110 is configured for MTC or configured as a low priority device (step S320). Later, in response to the mobile communication function of the mobile communication device 110 being switched off (such as the Flight mode) before the back-off timer expires, the controller module 112 stores the "forbidden PLMN list" and the back-off timer is kept running (step S330). The mobile communication function of the mobile communication device 110 may be switched off by powering off the wireless module 111 and/or the controller module 112, or by switching the voltage provided to the wireless module 111 and/or the controller module 112 to a relatively low level. In another embodiment, the back-off timer may be kept running in response to the mobile communication device 110 detaching from the service network 120, instead of in response to the mobile communication function of the mobile communication device 110 being switched off.

Subsequently, when the mobile communication function of the mobile communication device 110 is switched on again, the controller module 112 determines whether the back-off timer has expired (step S340). As the back-off timer has not expired in this embodiment, the controller module 112 remains forbidden to access the service network 120. After that, the controller module 112 removes or clears the "forbidden PLMN list" when the back-off timer expires (step S350). In another embodiment, if the back-off timer is determined to have already expired in the step S340, the controller module 112 directly removes or clears the "forbidden PLMN list". Note that, during the running period of the back-off timer, the PLMN identity which the service network 120 belongs to remains in the "forbidden PLMN list", so the mobile communication device 110 is forbidden to access the service network 120. Thus, the communication traffic to the service network 120 may be subject to control and the mobile communication device 110 may be able to obtain normal services by the proper handling of the back-off timer, T3245.

Figure 4:
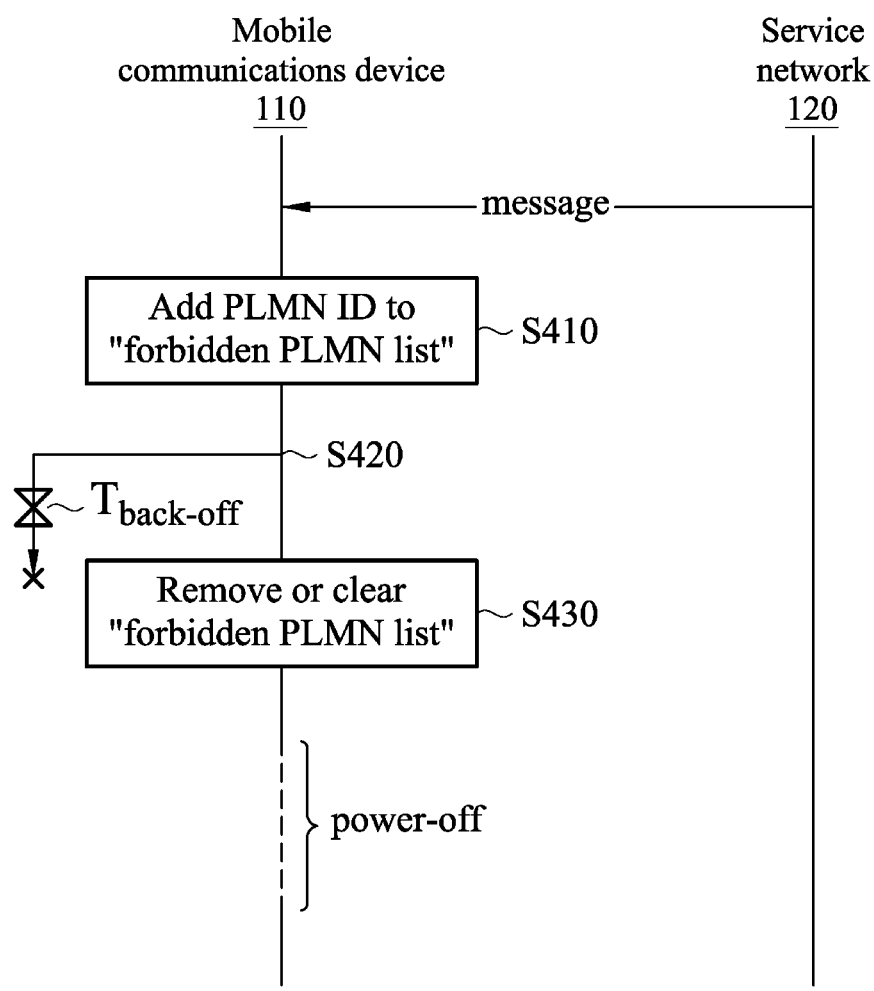
FIG. 4 is a message sequence chart illustrating the handling of the back-off timer and the "forbidden PLMN list" maintained for access control of the low priority devices or MTC devices according to yet another embodiment of the invention.

FIG. 4 is a message sequence chart illustrating the handling of the back-off timer and the "forbidden PLMN list" maintained for access control of the low priority devices or MTC devices according to yet another embodiment of the invention. Similar to FIG. 2, the handling of the back-off timer in this embodiment is triggered by the mobile communication device 110 receiving a particular message from the service network 120. This particular message may be an ATTACH REJECT message received during an attachment procedure, which contains a rejection cause indicating "PLMN not allowed", or may be a ROUTING AREA UPDATE REJECT/LOCATION UPDATING REJECT message received during a location registration procedure, which contains a rejection cause indicating "PLMN not allowed", or may be a SERVICE REJECT message received during a service request procedure, which contains a rejection cause indicating "PLMN not allowed". Alternatively, this particular message may be a DETACH REQUEST message received during a network initiated detachment procedure, which contains a detachment type of "re-attach not required" and a detachment cause indicating "PLMN not allowed". When receiving this particular message from the service network 120, the controller module 112 adds to the "forbidden PLMN list" the PLMN identity which the service network 120 belongs to (step S410). In response to the update of the "forbidden PLMN list", the controller module 112 starts the back-off timer, T3245, with a random value in the range from 24 hrs to 48 hrs since the mobile communication device 110 is configured for MTC or configured as a low priority device (step S420). Later, in response to the mobile communication device 110 being powered off before the back-off timer expires, the controller module 112 removes or clears the "forbidden PLMN list" (step S430). In other words, the back-off timer is stopped in response to the power-off of the mobile communication device 110, regardless of the amount of the remaining time for the back-off timer to expire. In another embodiment, the "forbidden PLMN list" may be removed or cleared in response to the mobile communication device 110 detaching from the service network 120, instead of in response to the mobile communication device 110 being powered off.

Subsequently, when the mobile communication device 110 is powered on again, the mobile communication device 110 is allowed to access the service network since the PLMN identity which the service network 120 belongs to is no longer in the "forbidden PLMN list". Thus, the mobile communication device 110 may be able to obtain normal services by the proper handling of the back-off timer, T3245 and the "forbidden PLMN list".

Figure 5:
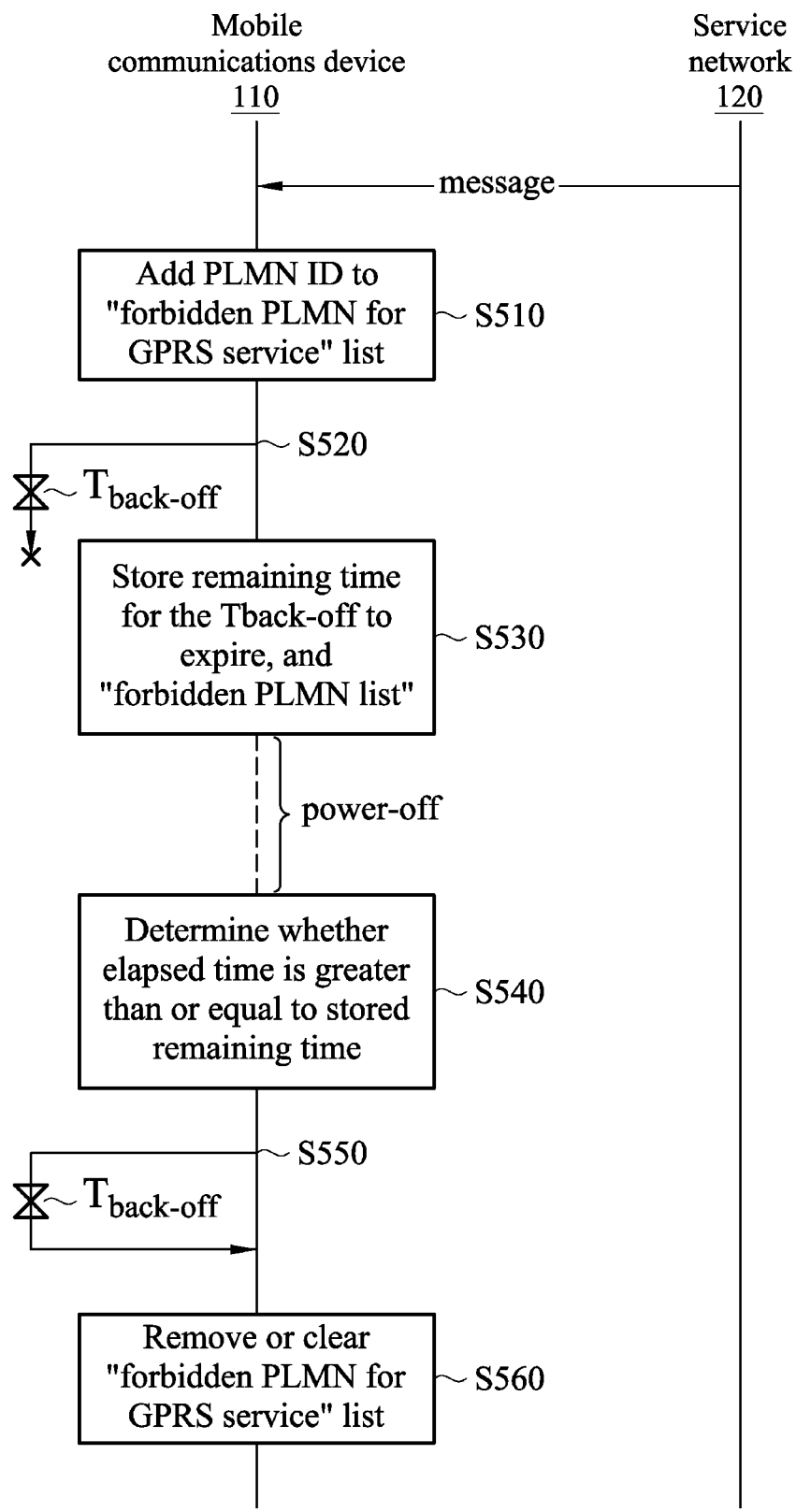
FIG. 5 is a message sequence chart illustrating the handling of the back-off timer and the "forbidden PLMN for GPRS service" list maintained for access control of the low priority devices or MTC devices according to an embodiment of the invention.

FIG. 5 is a message sequence chart illustrating the handling of the back-off timer and the "forbidden PLMN for GPRS service" list maintained for access control of the low priority devices or MTC devices according to an embodiment of the invention. In this embodiment, the handling of the back-off timer is triggered by the mobile communication device 110 receiving a particular message from the service network 120. This particular message may be an ATTACH REJECT message received during an attachment procedure, which contains a rejection cause indicating "GPRS services not allowed in this PLMN", or may be a ROUTING AREA UPDATE REJECT message received during a location registration procedure, which contains a rejection cause indicating "GPRS services not allowed in this PLMN". Alternatively, this particular message may be a DETACH REQUEST message received during a network initiated detachment procedure, which contains a detachment type of "re-attach not required" and a detachment cause indicating "GPRS services not allowed in this PLMN". When receiving this particular message from the service network 120, the controller module 112 adds to the "forbidden PLMN for GPRS service" list the PLMN identity which the service network 120 belongs to (step S510). In response to the update of the "forbidden PLMN for GPRS service" list, the controller module 112 starts the back-off timer, T3245, with a random value in the range from 24 hrs to 48 hrs since the mobile communication device 110 is configured for MTC or configured as a low priority device (step S520). Later, in response to the mobile communication device 110 being powered off before the back-off timer expires, the controller module 112 stores the amount of the remaining time for the back-off timer to expire and the "forbidden PLMN for GPRS service" list (step S530). Subsequently, when the mobile communication device 110 is powered on again, the controller module 112 determines whether the time elapsed from the last power-off of the mobile communication device 110 is greater than or equal to the remaining time (step S540).

In another embodiment, the amount of the remaining time for the back-off timer to expire may be stored in response to the mobile communication device 310 detaching from the service network 120, instead of in response to the power-off of the mobile communication device 110, and the controller module 112 may determine whether the time elapsed from the detachment of the mobile communication device 110 from the service network 120 is greater than or equal to the remaining time, when the mobile communication device 110 is powered on again.

As the elapsed time is less than the remaining time in this embodiment, the controller module 112 starts the back-off timer with the result of the remaining time minus the elapsed time (step S550). After that, the controller module 112 removes or clears the "forbidden PLMN for GPRS service" list when the back-off timer expires (step S560). In another embodiment, if the elapsed time is determined to be greater than or equal to the remaining time in the step S540, the controller module 112 does not start the back-off timer, and instead, directly removes or clears the "forbidden PLMN for GPRS service" list. Note that, during the running period of the back-off timer, the PLMN identity which the service network 120 belongs to remains in the "forbidden PLMN for GPRS service" list, so the mobile communication device 110 is forbidden to access the service network 120. Thus, the communication traffic to the service network 120 may be subject to control and the mobile communication device 110 may be able to obtain normal services by the proper handling of the back-off timer, T3245.

Figure 6:
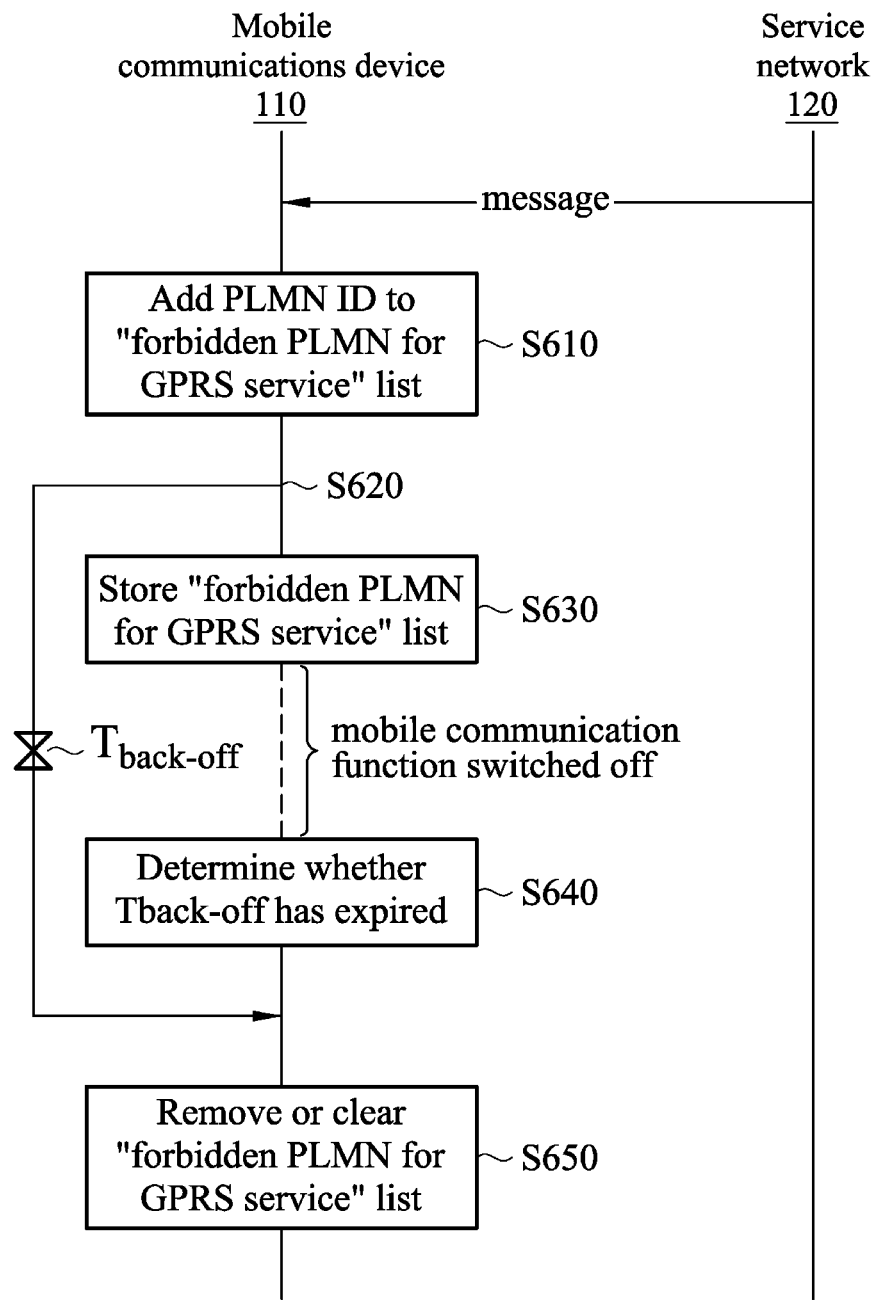
FIG. 6 is a message sequence chart illustrating the handling of the back-off timer and the "forbidden PLMN for GPRS service" list maintained for access control of the low priority devices or MTC devices according to another embodiment of the invention.

FIG. 6 is a message sequence chart illustrating the handling of the back-off timer and the "forbidden PLMN for GPRS service" list maintained for access control of the low priority devices or MTC devices according to another embodiment of the invention. In this embodiment, the handling of the back-off timer is triggered by the mobile communication device 110 receiving a particular message from the service network 120. This particular message may be an ATTACH REJECT message received during an attachment procedure, which contains a rejection cause indicating "GPRS services not allowed in this PLMN", or may be a ROUTING AREA UPDATE REJECT message received during a location registration procedure, which contains a rejection cause indicating "GPRS services not allowed in this PLMN". Alternatively, this particular message may be a DETACH REQUEST message received during a network initiated detachment procedure, which contains a detachment type of "re-attach not required" and a detachment cause indicating "GPRS services not allowed in this PLMN". When receiving this particular message from the service network 120, the controller module 112 adds to the "forbidden PLMN for GPRS service" list the PLMN identity which the service network 120 belongs to (step S610). In response to the update of the "forbidden PLMN for GPRS service" list, the controller module 112 starts the back-off timer, T3245, with a random value in the range from 24 hrs to 48 hrs since the mobile communication device 110 is configured for MTC or configured as a low priority device (step S620). Later, in response to the mobile communication function of the mobile communication device 110 being switched off (such as the Flight mode) before the back-off timer expires, the controller module 112 stores the "forbidden PLMN for GPRS service" list and the back-off timer is kept running (step S630). The mobile communication function of the mobile communication device 110 may be switched off by powering off the wireless module 111 and/or the controller module 112, or by switching the voltage provided to the wireless module 111 and/or the controller module 112 to a relatively low level. In another embodiment, the back-off timer may be kept running in response to the mobile communication device 110 detaching from the service network 120, instead of in response to the mobile communication function of the mobile communication device 110 being switched off.

Subsequently, when the mobile communication function of the mobile communication device 110 is switched on again, the controller module 112 determines whether the back-off timer has expired (step S640). As the back-off timer has not expired in this embodiment, the controller module 112 remains forbidden to access the service network 120. After that, the controller module 112 removes or clears the "forbidden PLMN for GPRS service" list when the back-off timer expires (step S650). In another embodiment, if the back-off timer is determined to have already expired in the step S640, the controller module 112 directly removes or clears the "forbidden PLMN for GPRS service" list. Note that, during the running period of the back-off timer, the PLMN identity which the service network 120 belongs to remains in the "forbidden PLMN for GPRS service" list, so the mobile communication device 110 is forbidden to access the service network 120. Thus, the communication traffic to the service network 120 may be subject to control and the mobile communication device 110 may be able to obtain normal services by the proper handling of the back-off timer, T3245.

Figure 7:
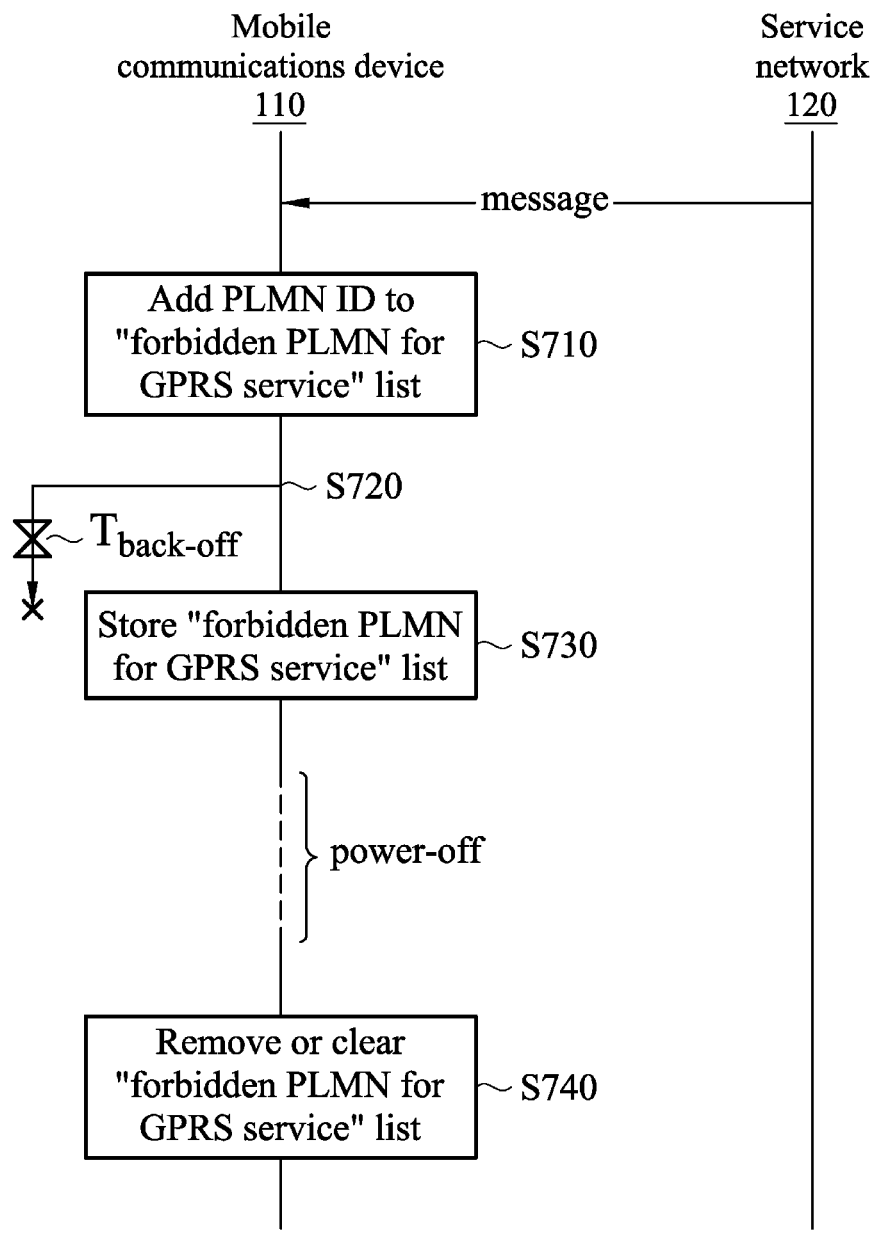
FIG. 7 is a message sequence chart illustrating the handling of the back-off timer and the "forbidden PLMN for GPRS service" list maintained for access control of the low priority devices or MTC devices according to yet another embodiment of the invention.

FIG. 7 is a message sequence chart illustrating the handling of the back-off timer and the "forbidden PLMN for GPRS service" list maintained for access control of the low priority devices or MTC devices according to yet another embodiment of the invention. Similar to FIG. 5, the handling of the back-off timer in this embodiment is triggered by the mobile communication device 110 receiving a particular message from the service network 120. This particular message may be an ATTACH REJECT message received during an attachment procedure, which contains a rejection cause indicating "GPRS services not allowed in this PLMN", or may be a ROUTING AREA UPDATE REJECT message received during a location registration procedure, which contains a rejection cause indicating "GPRS services not allowed in this PLMN". Alternatively, this particular message may be a DETACH REQUEST message received during a network initiated detachment procedure, which contains a detachment type of "re-attach not required" and a detachment cause indicating "GPRS services not allowed in this PLMN". When receiving this particular message from the service network 120, the controller module 112 adds to the "forbidden PLMN for GPRS service" list the PLMN identity which the service network 120 belongs to (step S710). In response to the update of the "forbidden PLMN for GPRS service" list, the controller module 112 starts the back-off timer, T3245, with a random value in the range from 24 hrs to 48 hrs since the mobile communication device 110 is configured for MTC or configured as a low priority device (step S720). Later, in response to the mobile communication device 110 being powered off before the back-off timer expires, the controller module 112 stores the "forbidden PLMN for GPRS service" list (step S730). In other words, the back-off timer is stopped in response to the power-off of the mobile communication device 110, regardless of the amount of the remaining time for the back-off timer to expire. In another embodiment, the "forbidden PLMN for GPRS service" list may be stored in response to the mobile communication device 110 detaching from the service network 120, instead of in response to the mobile communication device 110 being powered off.

Subsequently, when the mobile communication device 110 is powered on again, the mobile communication device 110 removes or clears the "forbidden PLMN for GPRS service" list (step S740), and thereby, is allowed to access the service network since the PLMN identity which the service network 120 belongs to is no longer in the "forbidden PLMN for GPRS service" list. Thus, the mobile communication device 110 may be able to obtain normal services by the proper handling of the back-off timer, T3245 and the "forbidden PLMN for GPRS service" list.

Figure 8:
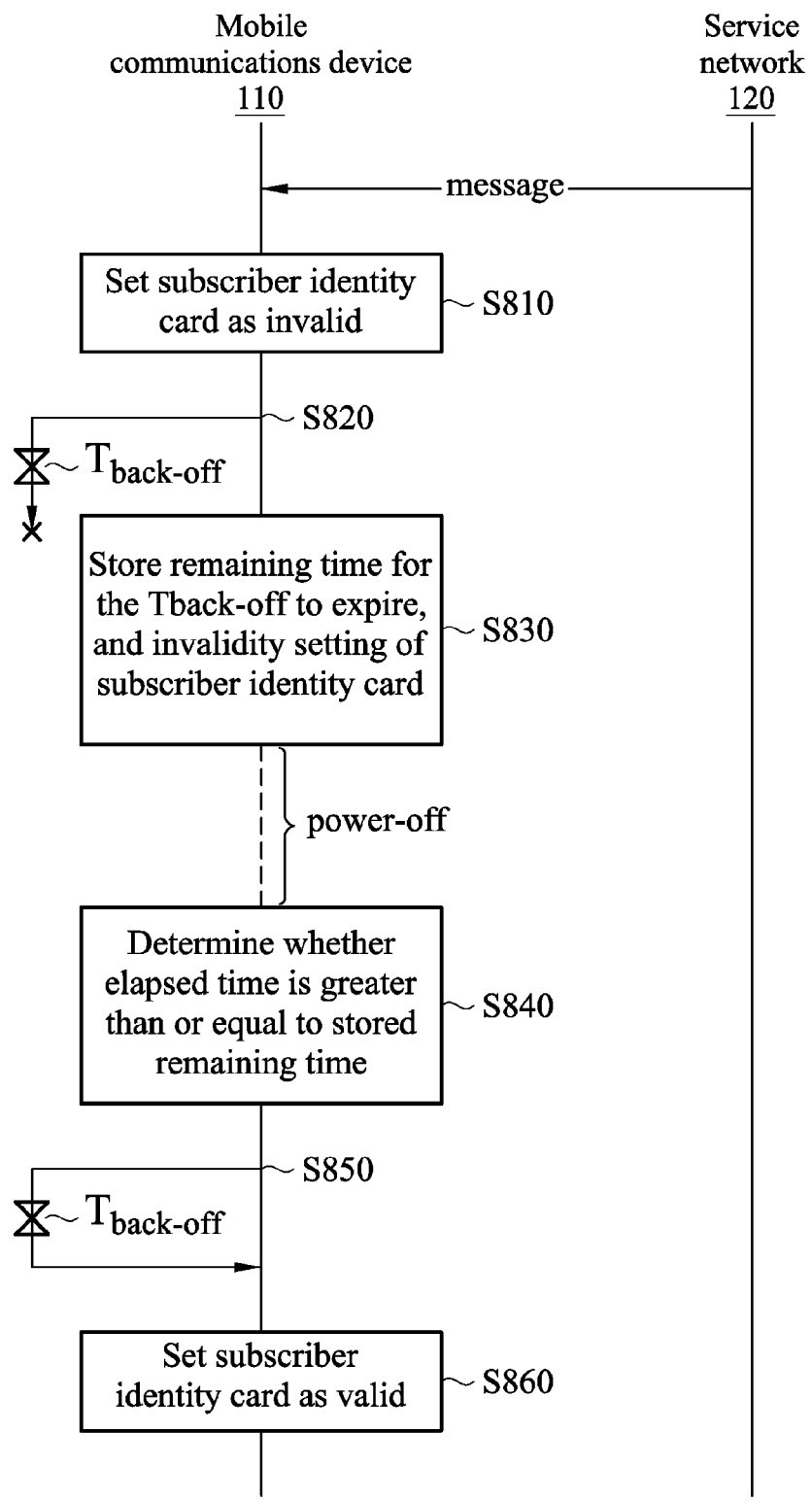
FIG. 8 is a message sequence chart illustrating the handling of the back-off timer and the validity setting of the subscriber identity card maintained for access control of the low priority devices or MTC devices according to an embodiment of the invention.

FIG. 8 is a message sequence chart illustrating the handling of the back-off timer and the validity setting of the subscriber identity card maintained for access control of the low priority devices or MTC devices according to an embodiment of the invention. In this embodiment, the handling of the back-off timer is triggered by the mobile communication device 110 receiving a particular message from the service network 120. This particular message may be a ROUTING AREA UPDATE REJECT/LOCATION UPDATING REJECT message received during a location registration procedure, which contains a rejection cause indicating "Illegal ME", or a CM SERVICE REJECT message received during a service request procedure or call re-establishment procedure, which contains a rejection cause indicating "Illegal ME". Alternatively, this particular message may be a DETACH REQUEST message received during a network initiated detachment procedure, which contains a detachment type of "re-attach not required" and a detachment cause indicating "IMSI unknown in HLR". When receiving this particular message from the service network 120, the controller module 112 sets the subscriber identity card coupled to/in the mobile communication device 110 as invalid (step S810). In response to the invalidity setting of the subscriber identity card, the controller module 112 starts the back-off timer, T3245, with a random value in the range from 24 hrs to 48 hrs since the mobile communication device 110 is configured for MTC or configured as a low priority device (step S820). Later, in response to the mobile communication device 110 being powered off before the back-off timer expires, the controller module 112 stores the amount of the remaining time for the back-off timer to expire and the invalidity setting of the subscriber identity card (step S830). Subsequently, when the mobile communication device 110 is powered on again, the controller module 112 determines whether the time elapsed from the last power-off of the mobile communication device 110 is greater than or equal to the remaining time (step S840).

In another embodiment, the amount of the remaining time for the back-off timer to expire may be stored in response to the mobile communication device 310 detaching from the service network 120, instead of in response to the power-off of the mobile communication device 110, and the controller module 112 may determine whether the time elapsed from the detachment of the mobile communication device 110 from the service network 120 is greater than or equal to the remaining time, when the mobile communication device 110 is powered on again.

As the elapsed time is less than the remaining time in this embodiment, the controller module 112 starts the back-off timer with the result of the remaining time minus the elapsed time (step S850). After that, the controller module 112 sets the subscriber identity card as valid when the back-off timer expires (step S860). In another embodiment, if the elapsed time is determined to be greater than or equal to the remaining time in the step S840, the controller module 112 does not start the back-off timer, and instead, directly sets the subscriber identity card as valid. Note that, during the running period of the back-off timer, the invalidity setting of the subscriber identity card remains unchanged, so the mobile communication device 110 is forbidden to access the service network 120. Thus, the communication traffic to the service network 120 may be subject to control and the mobile communication device 110 may be able to obtain normal services by the proper handling of the back-off timer, T3245.

Figure 9:
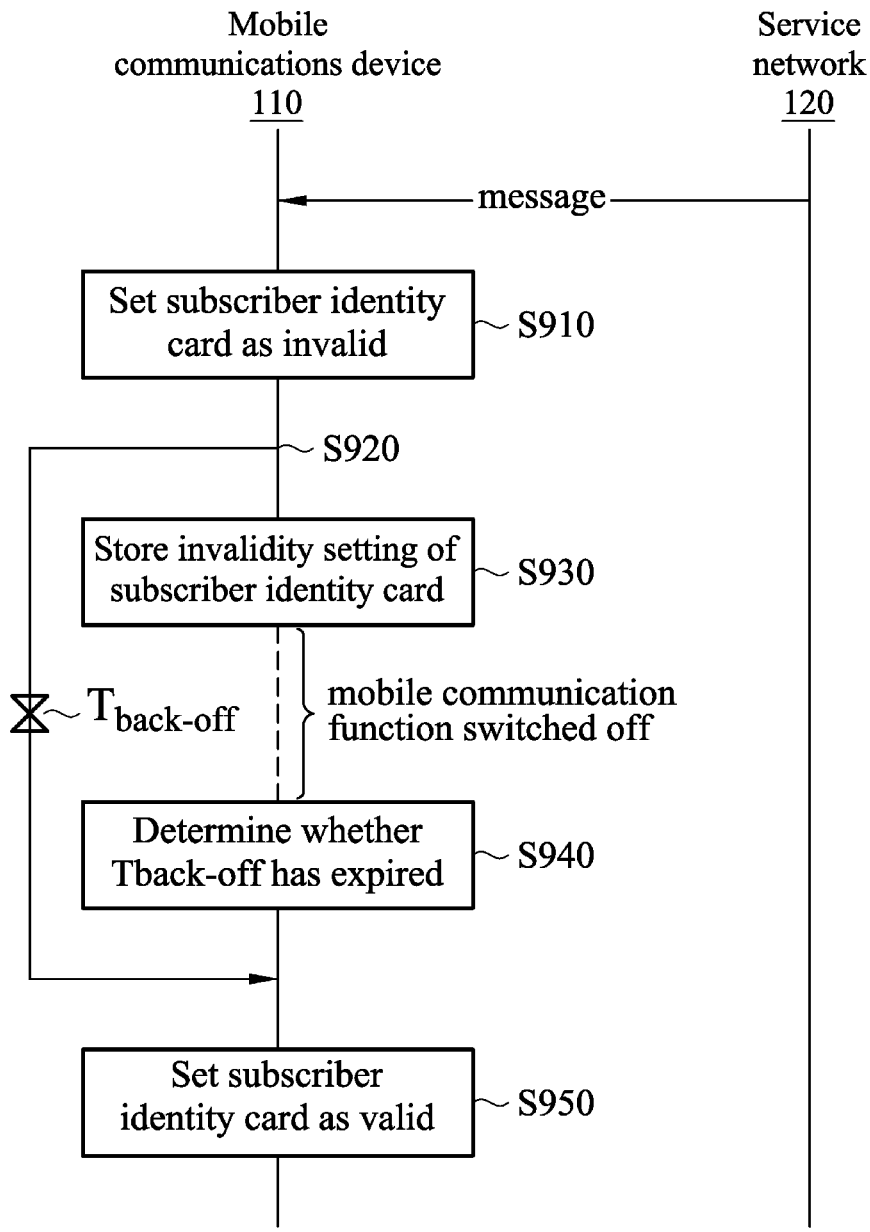
FIG. 9 is a message sequence chart illustrating the handling of the back-off timer and the validity setting of the subscriber identity card maintained for access control of the low priority devices or MTC devices according to another embodiment of the invention.

FIG. 9 is a message sequence chart illustrating the handling of the back-off timer and the validity setting of the subscriber identity card maintained for access control of the low priority devices or MTC devices according to another embodiment of the invention. Similar to FIG. 8, the handling of the back-off timer in this embodiment is triggered by the mobile communication device 110 receiving a particular message from the service network 120. This particular message may be a ROUTING AREA UPDATE REJECT/LOCATION UPDATING REJECT message received during a location registration procedure, which contains a rejection cause indicating "Illegal ME", or a CM SERVICE REJECT message received during a service request procedure or call re-establishment procedure, which contains a rejection cause indicating "Illegal ME". Alternatively, this particular message may be a DETACH REQUEST message received during a network initiated detachment procedure, which contains a detachment type of "re-attach not required" and a detachment cause indicating "IMSI unknown in HLR". When receiving this particular message from the service network 120, the controller module 112 sets the subscriber identity card coupled to/in the mobile communication device 110 as invalid (step S910). In response to the invalidity setting of the subscriber identity card, the controller module 112 starts the back-off timer, T3245, with a random value in the range from 24 hrs to 48 hrs since the mobile communication device 110 is configured for MTC or configured as a low priority device (step S920). Later, in response to the mobile communication function of the mobile communication device 110 being switched off (such as the Flight mode) before the back-off timer expires, the controller module 112 stores the invalidity setting of the subscriber identity card and the back-off timer is kept running (step S930). The mobile communication function of the mobile communication device 110 may be switched off by powering off the wireless module 111 and/or the controller module 112, or by switching the voltage provided to the wireless module 111 and/or the controller module 112 to a relatively low level. In another embodiment, the back-off timer may be kept running in response to the mobile communication device 110 detaching from the service network 120, instead of in response to the mobile communication function of the mobile communication device 110 being switched off.

Subsequently, when the mobile communication function of the mobile communication device 110 is switched on again, the controller module 112 determines whether the back-off timer has expired (step S940). As the back-off timer has not expired in this embodiment, the controller module 112 remains forbidden to access the service network 120. After that, the controller module 112 sets the subscriber identity card as valid when the back-off timer expires (step S950). In another embodiment, if the back-off timer is determined to have already expired in the step S940, the controller module 112 directly sets the subscriber identity card as valid. Note that, during the running period of the back-off timer, the invalidity setting of the subscriber identity card remains unchanged, so the mobile communication device 110 is forbidden to access the service network 120. Thus, the communication traffic to the service network 120 may be subject to control and the mobile communication device 110 may be able to obtain normal services by the proper handling of the back-off timer, T3245.

Figure 10:
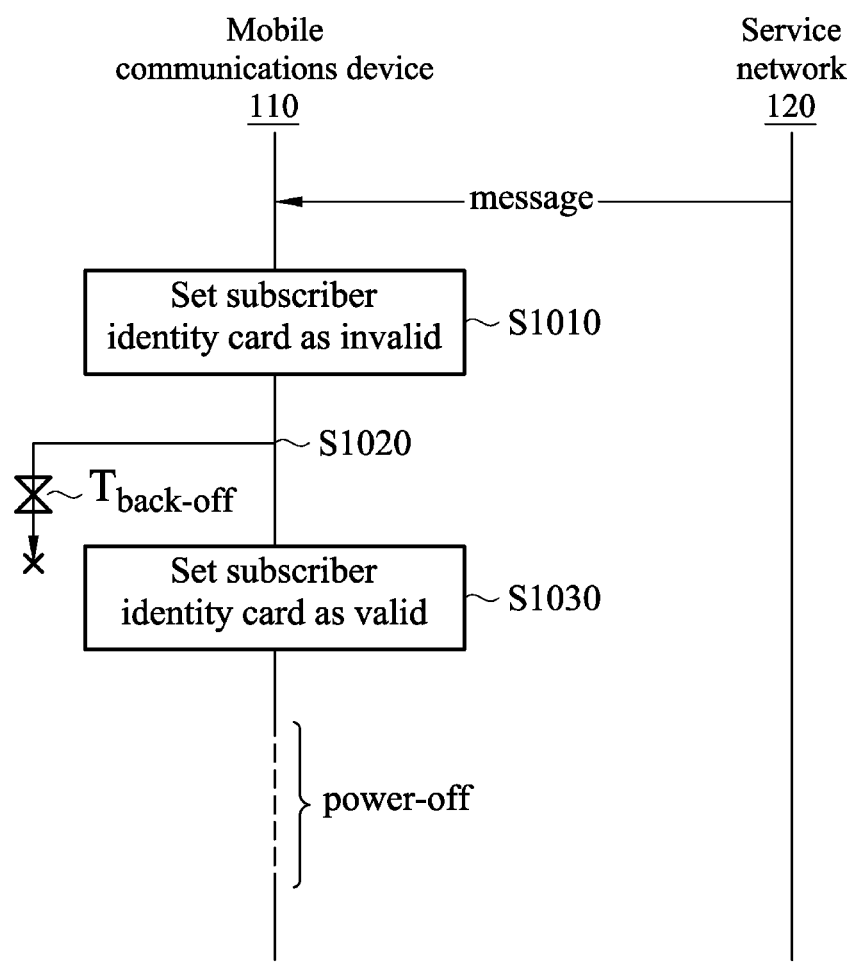
FIG. 10 is a message sequence chart illustrating the handling of the back-off timer and the validity setting of the subscriber identity card maintained for access control of the low priority devices or MTC devices according to yet another embodiment of the invention.

FIG. 10 is a message sequence chart illustrating the handling of the back-off timer and the validity setting of the subscriber identity card maintained for access control of the low priority devices or MTC devices according to yet another embodiment of the invention. Similar to FIG. 8, the handling of the back-off timer in this embodiment is triggered by the mobile communication device 110 receiving a particular message from the service network 120. This particular message may be a ROUTING AREA UPDATE REJECT/LOCATION UPDATING REJECT message received during a location registration procedure, which contains a rejection cause indicating "Illegal ME", or a CM SERVICE REJECT message received during a service request procedure or call re-establishment procedure, which contains a rejection cause indicating "Illegal ME". Alternatively, this particular message may be a DETACH REQUEST message received during a network initiated detachment procedure, which contains a detachment type of "re-attach not required" and a detachment cause indicating "IMSI unknown in HLR". When receiving this particular message from the service network 120, the controller module 112 sets the subscriber identity card coupled to/in the mobile communication device 110 as invalid (step S1010). In response to the invalidity setting of the subscriber identity card, the controller module 112 starts the back-off timer, T3245, with a random value in the range from 24 hrs to 48 hrs since the mobile communication device 110 is configured for MTC or configured as a low priority device (step S1020). Later, in response to the mobile communication device 110 being powered off before the back-off timer expires, the controller module 112 sets the subscriber identity card as valid (step S1030). In other words, the back-off timer is stopped in response to the power-off of the mobile communication device 110, regardless of the amount of the remaining time for the back-off timer to expire. In another embodiment, the subscriber identity card may be set as valid in response to the mobile communication device 110 detaching from the service network 120, instead of in response to the mobile communication device 110 being powered off.

Subsequently, when the mobile communication device 110 is powered on again, the mobile communication device 110 is allowed to access the service network since the subscriber identity card is no longer invalid. Alternatively, in step S1030, the controller module 112 may directly store the invalidity setting of the subscriber identity card, and postpone the setting of the subscriber identity card as being valid until the mobile communication device 110 expires. Thus, the mobile communication device 110 may be able to obtain normal services by the proper handling of the back-off timer, T3245 and the validity setting of the subscriber identity card.

Figure 11:
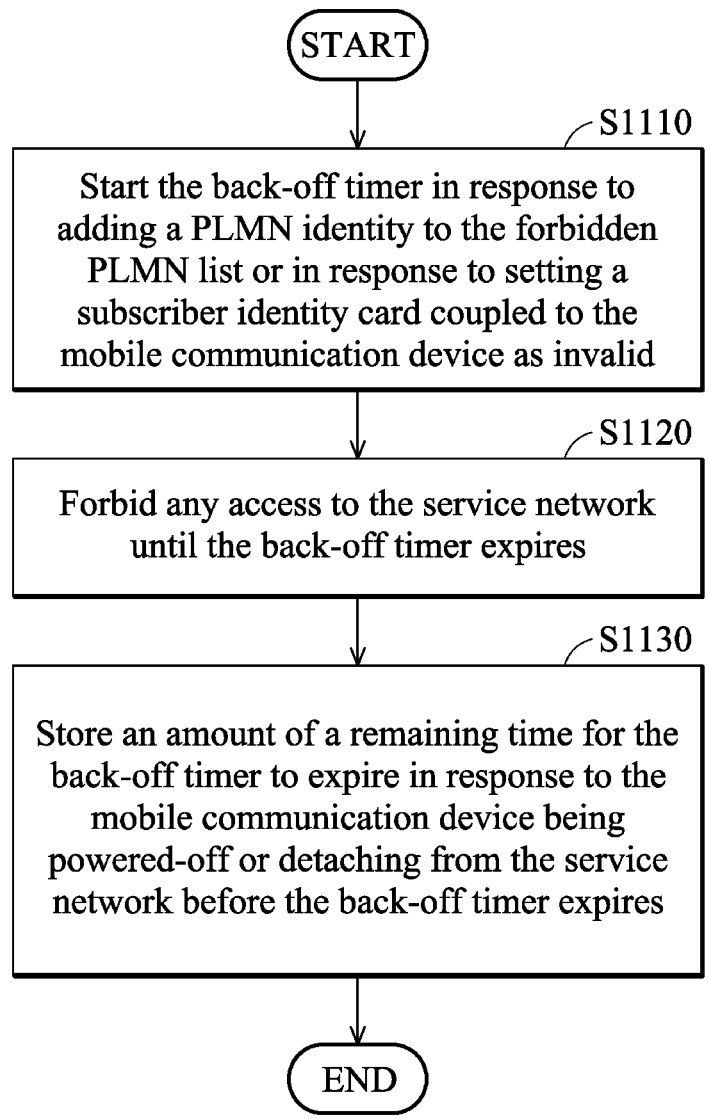
FIG. 11 is a flow chart illustrating a method for access control with a back-off timer maintained for a low priority or MTC device according to an embodiment of the invention.

FIG. 11 is a flow chart illustrating a method for access control with a back-off timer maintained for a low priority or MTC device according to an embodiment of the invention. In this embodiment, the method may be applied to any mobile communication device which is configured for MTC or configured as a low priority device, such as the mobile communication device 110 in FIG. 1. To begin the method, the mobile communication device starts the back-off timer in response to adding a PLMN identity to the forbidden PLMN list or in response to setting a subscriber identity card coupled to the mobile communication device as invalid (step S1110). In one embodiment, the forbidden PLMN list may be a "forbidden PLMN list" storing the PLMN identities to which the mobile communication device are forbidden to access for non-GPRS services, and the adding of the PLMN identity to the "forbidden PLMN list" may be triggered by the mobile communication device receiving a particular message from a service network, wherein the particular message may be an ATTACH REJECT message received during an attachment procedure, which contains a rejection cause indicating "PLMN not allowed", or may be a ROUTING AREA UPDATE REJECT/LOCATION UPDATING REJECT message received during a location registration procedure, which contains a rejection cause indicating "PLMN not allowed", or may be a SERVICE REJECT message received during a service request procedure, which contains a rejection cause indicating "PLMN not allowed". Alternatively, this particular message may be a DETACH REQUEST message received during a network initiated detachment procedure, which contains a detachment type of "re-attach not required" and a detachment cause indicating "PLMN not allowed". In another embodiment, the forbidden PLMN list may be a "forbidden PLMN for GPRS service" list storing the PLMN identities to which the mobile communication device are forbidden to access for GPRS services or EPS services, and the adding of the PLMN identity to the "forbidden PLMN for GPRS service" list may be triggered by the mobile communication device receiving a particular message from a service network, wherein the particular message may be an ATTACH REJECT message received during an attachment procedure, which contains a rejection cause indicating "GPRS services not allowed in this PLMN", or may be a ROUTING AREA UPDATE REJECT message received during a location registration procedure, which contains a rejection cause indicating "GPRS services not allowed in this PLMN". Alternatively, this particular message may be a DETACH REQUEST message received during a network initiated detachment procedure, which contains a detachment type of "re-attach not required" and a detachment cause indicating "GPRS services not allowed in this PLMN". In one embodiment, the setting of the subscriber identity card as invalid may be triggered by the mobile communication device receiving a particular message from a service network, wherein the particular message may be a ROUTING AREA UPDATE REJECT/LOCATION UPDATING REJECT message received during a location registration procedure, which contains a rejection cause indicating "Illegal ME", or a CM SERVICE REJECT message received during a service request procedure or call re-establishment procedure, which contains a rejection cause indicating "Illegal ME". Alternatively, this particular message may be a DETACH REQUEST message received during a network initiated detachment procedure, which contains a detachment type of "re-attach not required" and a detachment cause indicating "IMSI unknown in HLR".

Subsequently, the mobile communication device forbids any access to the service network until the back-off timer expires (step S1120). Later, the mobile communication device stores an amount of a remaining time for the back-off timer to expire in response to the mobile communication device being powered-off or detaching from the service network before the back-off timer expires (step S1130). Since the amount of the remaining time for the back-off timer to expire is stored before the power-off, the mobile communication device, after being powered on again, may determine whether the time elapsed from the power-off is greater than or equal to the remaining time. If the elapsed time is greater than or equal to the remaining time, the mobile communication device may remove or clear the forbidden PLMN list or set the subscriber identity card as valid, and be able to access the service network thereafter. Specifically, the forbidden PLMN list and the invalidity setting of the subscriber identity card are stored before the power-off of the mobile communication device. Otherwise, if the elapsed time is less than the remaining time, the mobile communication device may start the back-off timer with the result of the remaining time minus the elapsed time, and only remove or clear the forbidden PLMN list or set the subscriber identity card as valid when the back-off timer expires.

Note that, with the proposed method, the PLMN identity to which the service network belongs, remains in the forbidden PLMN list or the invalidity setting of the subscriber identity card remains unchanged during the running period of the back-off timer, so the mobile communication device is forbidden to access the service network. Thus, the communication traffic to the service network may be subject to control and the mobile communication device may be able to obtain normal services by the proper handling of the back-off timer.

Figure 12:
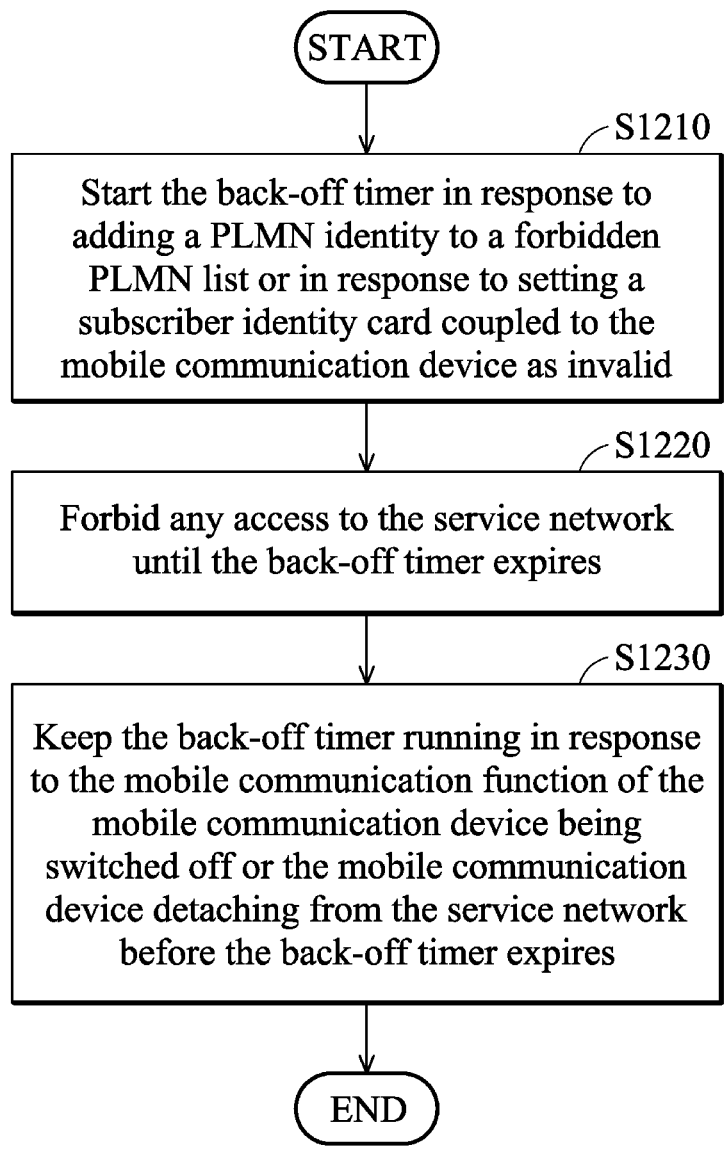
FIG. 12 is a flow chart illustrating a method for access control with a back-off timer maintained for a low priority or MTC device according to another embodiment of the invention.

FIG. 12 is a flow chart illustrating a method for access control with a back-off timer maintained for a low priority or MTC device according to another embodiment of the invention. Similar to FIG. 11, the method in this embodiment may be applied to any mobile communication device which is configured for MTC or configured as a low priority device, such as the mobile communication device 110 in FIG. 1. To begin the method, the mobile communication device starts the back-off timer in response to adding a PLMN identity to the forbidden PLMN list or in response to setting a subscriber identity card coupled to the mobile communication device as invalid (step S1210). In one embodiment, the forbidden PLMN list may be a "forbidden PLMN list" storing the PLMN identities to which the mobile communication device are forbidden to access for non-GPRS services, and the adding of the PLMN identity to the "forbidden PLMN list" may be triggered by the mobile communication device receiving a particular message from a service network, wherein the particular message may be an ATTACH REJECT message received during an attachment procedure, which contains a rejection cause indicating "PLMN not allowed", or may be a ROUTING AREA UPDATE REJECT/LOCATION UPDATING REJECT message received during a location registration procedure, which contains a rejection cause indicating "PLMN not allowed", or may be a SERVICE REJECT message received during a service request procedure, which contains a rejection cause indicating "PLMN not allowed". Alternatively, this particular message may be a DETACH REQUEST message received during a network initiated detachment procedure, which contains a detachment type of "reattach not required" and a detachment cause indicating "PLMN not allowed". In another embodiment, the forbidden PLMN list may be a "forbidden PLMN for GPRS service" list storing the PLMN identities to which the mobile communication device are forbidden to access for GPRS services or EPS services, and the adding of the PLMN identity to the "forbidden PLMN for GPRS service" list may be triggered by the mobile communication device receiving a particular message from a service network, wherein the particular message may be an ATTACH REJECT message received during an attachment procedure, which contains a rejection cause indicating "GPRS services not allowed in this PLMN", or may be a ROUTING AREA UPDATE REJECT message received during a location registration procedure, which contains a rejection cause indicating "GPRS services not allowed in this PLMN". Alternatively, this particular message may be a DETACH REQUEST message received during a network initiated detachment procedure, which contains a detachment type of "re-attach not required" and a detachment cause indicating "GPRS services not allowed in this PLMN". In one embodiment, the setting of the subscriber identity card as invalid may be triggered by the mobile communication device receiving a particular message from a service network, wherein the particular message may be a ROUTING AREA UPDATE REJECT/LOCATION UPDATING REJECT message received during a location registration procedure, which contains a rejection cause indicating "Illegal ME", or a CM SERVICE REJECT message received during a service request procedure or call re-establishment procedure, which contains a rejection cause indicating "Illegal ME". Alternatively, this particular message may be a DETACH REQUEST message received during a network initiated detachment procedure, which contains a detachment type of "re-attach not required" and a detachment cause indicating "IMSI unknown in HLR".

Subsequently, the mobile communication device forbids any access to the service network until the back-off timer expires (step S1220). Later, the mobile communication device keeps the back-off timer running in response to the mobile communication function of the mobile communication device being switched off or the mobile communication device detaching from the service network before the back-off timer expires (step S1230). Since the back-off timer is kept running during the time period where the mobile communication function is switched-off, the mobile communication device may determine whether the back-off timer has expired when the mobile communication function is switched-on again. If the back-off timer has expired, the mobile communication device may remove or clear the forbidden PLMN list or set the subscriber identity card as valid, and be able to access the service network thereafter. Specifically, the forbidden PLMN list and the invalidity setting of the subscriber identity card are stored before the mobile communication function of the mobile communication device is switched off. Otherwise, if the back-off timer has not expired, the mobile communication device may only remove or clear the forbidden PLMN list or set the subscriber identity card as valid when the back-off timer expires.

Note that, with the proposed method, the PLMN identity to which the service network belongs, remains in the forbidden PLMN list or the invalidity setting of the subscriber identity card remains unchanged during the running period of the back-off timer, so the mobile communication device is forbidden to access the service network. Thus, the communication traffic to the service network may be subject to control and the mobile communication device may be able to obtain normal services by the proper handling of the back-off timer.

Figure 13:
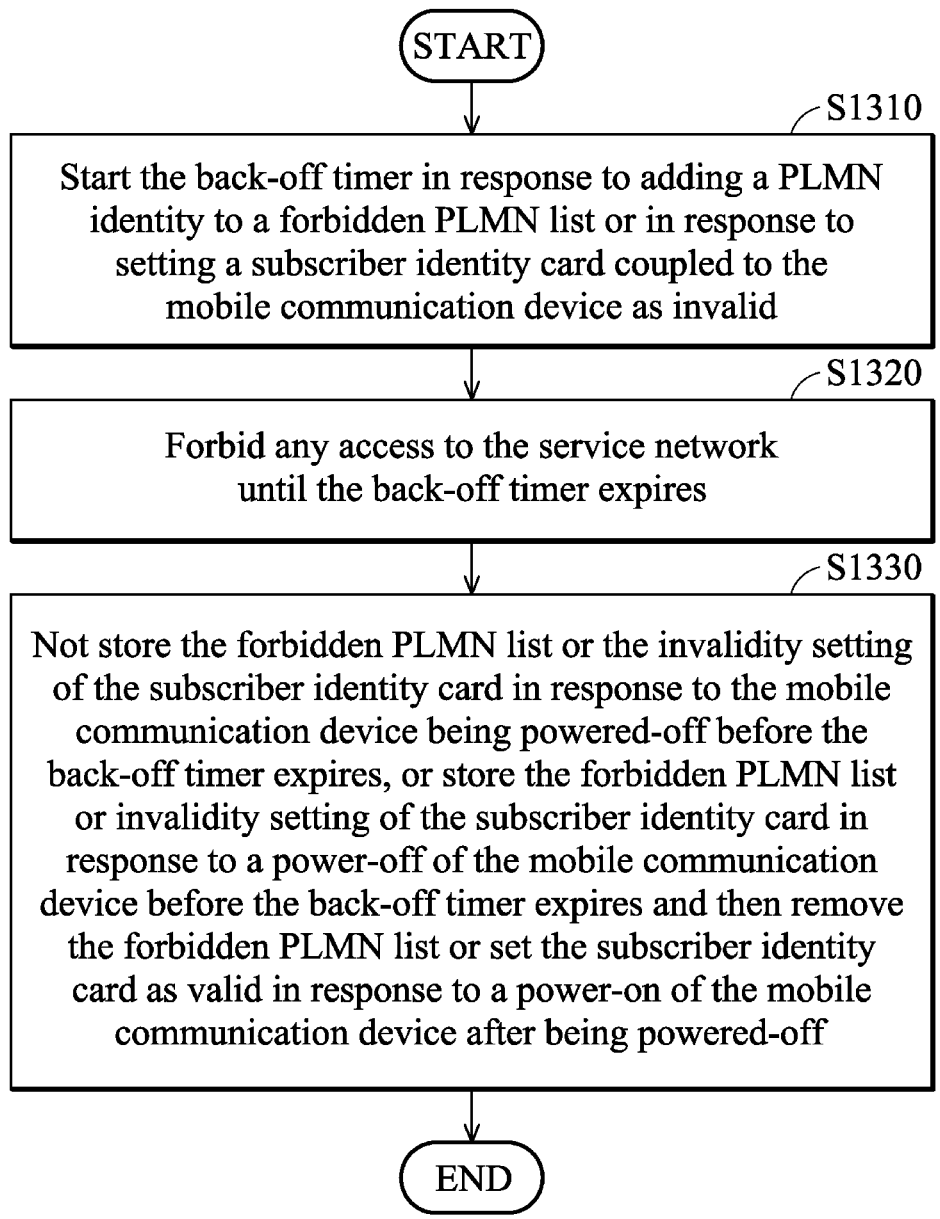
FIG. 13 is a flow chart illustrating a method for access control with a back-off off timer maintained for a low priority or MTC device according to yet another embodiment of the invention.

FIG. 13 is a flow chart illustrating a method for access control with a back-off timer maintained for a low priority or MTC device according to yet another embodiment of the invention. Similar to FIG. 11, the method in this embodiment may be applied to any mobile communication device which is configured for MTC or configured as a low priority device, such as the mobile communication device 110 in FIG. 1. To begin the method, the mobile communication device starts the back-off timer in response to adding a PLMN identity to the forbidden PLMN list or in response to setting a subscriber identity card coupled to the mobile communication device as invalid (step S1310). In one embodiment, the forbidden PLMN list may be a "forbidden PLMN list" storing the PLMN identities to which the mobile communication device are forbidden to access for non-GPRS services, and the adding of the PLMN identity to the "forbidden PLMN list" may be triggered by the mobile communication device receiving a particular message from a service network, wherein the particular message may be an ATTACH REJECT message received during an attachment procedure, which contains a rejection cause indicating "PLMN not allowed", or may be a ROUTING AREA UPDATE REJECT/LOCATION UPDATING REJECT message received during a location registration procedure, which contains a rejection cause indicating "PLMN not allowed", or may be a SERVICE REJECT message received during a service request procedure, which contains a rejection cause indicating "PLMN not allowed". Alternatively, this particular message may be a DETACH REQUEST message received during a network initiated detachment procedure, which contains a detachment type of "re-attach not required" and a detachment cause indicating "PLMN not allowed". In another embodiment, the forbidden PLMN list may be a "forbidden PLMN for GPRS service" list storing the PLMN identities to which the mobile communication device are forbidden to access for GPRS services or EPS services, and the adding of the PLMN identity to the "forbidden PLMN for GPRS service" list may be triggered by the mobile communication device receiving a particular message from a service network, wherein the particular message may be an ATTACH REJECT message received during an attachment procedure, which contains a rejection cause indicating "GPRS services not allowed in this PLMN", or may be a ROUTING AREA UPDATE REJECT message received during a location registration procedure, which contains a rejection cause indicating "GPRS services not allowed in this PLMN". Alternatively, this particular message may be a DETACH REQUEST message received during a network initiated detachment procedure, which contains a detachment type of "re-attach not required" and a detachment cause indicating "GPRS services not allowed in this PLMN". In one embodiment, the setting of the subscriber identity card as invalid may be triggered by the mobile communication device receiving a particular message from a service network, wherein the particular message may be a ROUTING AREA UPDATE REJECT/LOCATION UPDATING REJECT message received during a location registration procedure, which contains a rejection cause indicating "Illegal ME", or a CM SERVICE REJECT message received during a service request procedure or call re-establishment procedure, which contains a rejection cause indicating "Illegal ME". Alternatively, this particular message may be a DETACH REQUEST message received during a network initiated detachment procedure, which contains a detachment type of "re-attach not required" and a detachment cause indicating "IMSI unknown in HLR".

Subsequently, the mobile communication device forbids any access to the service network until the back-off timer expires (step S1320). Later, the mobile communication device does not store the forbidden PLMN list or the invalidity setting of the subscriber identity card in response to the mobile communication device being powered-off before the back-off timer expires, or stores the forbidden PLMN list or the invalidity setting of the subscriber identity card in response to the mobile communication device being powered-off before the back-off timer expires and then removes the forbidden PLMN list or sets the subscriber identity card as valid in response to a power-on of the mobile communication device after being powered-off (step S1330). In other words, the back-off timer is stopped when the mobile communication device is powered off. Note that, since the forbidden PLMN list and/or the invalidity setting of the subscriber identity card are not stored before the power-off, the mobile communication device may regard the PLMN identity to which the service network belongs as not forbidden and/or regard the subscriber identity card as valid, when the mobile communication device is powered on again. Thus, the mobile communication device may be able to obtain normal services by the proper handling of the back-off timer and the forbidden PLMN list and/or validity of the subscriber identity card.

While the invention has been described by way of example and in terms of preferred embodiment, it is to be understood that the invention is not limited thereto. Those who are skilled in this technology can still make various alterations and modifications without departing from the scope and spirit of this invention. For example, the method for access control with a back-off timer maintained for low priority devices and MTC devices may also be applied for mobile communication devices in compliance with any evolutionary technology of the WCDMA/LTE/LTE-Advanced technology. Therefore, the scope of the present invention shall be defined and protected by the following claims and their equivalents.

What is claimed is:

1. A mobile communication device, configured for Machine Type Communication (MTC) or configured as a low priority device, comprising:
   a wireless module performing wireless transmissions and receptions to and from a service network; and
   a controller module starting a back-off timer in response to adding a Public Land Mobile Network (PLMN) identity to a forbidden PLMN list or in response to setting a subscriber identity card coupled to the mobile communication device as invalid, forbidding any access to the service network via the wireless module until the back-off timer expires, and, before the back-off timer expires, storing an amount of a remaining time for the back-off timer to expire in response to a power-off of the mobile communication device or in response to detaching from the service network via the wireless module,
   wherein the controller module further determines whether the time elapsed from the power-off of the mobile communication device or from the detachment is greater than or equal to the remaining time, in response to a power-on of the mobile communication device,
   wherein, the controller module further, in response to the elapsed time being less than the remaining time, starts the back-off timer with a result of the remaining time minus the elapsed time, and
   wherein the controller module further removes the forbidden PLMN list and sets the subscriber identity card as valid in response to the back-off timer being expired.

2. The mobile communication device of claim 1, wherein the controller module further stores the forbidden PLMN list or the invalidity setting of the subscriber identity card, in response to the power-off of the mobile communication device.

3. The mobile communication device of claim 2, wherein the controller module further, in response to the elapsed time being greater than or equal to the remaining time, removes the forbidden PLMN list and sets the subscriber identity card as valid.

4. The mobile communication device of claim 1, wherein the forbidden PLMN list is maintained for General Packet Radio Service (GPRS) or non-GPRS services, and the invalidity setting of the subscriber identity card is set for GPRS or non-GPRS services.

5. A mobile communication device, configured for Machine Type Communication (MTC) or configured as a low priority device, comprising:
   a wireless module performing wireless transmissions and receptions to and from a service network; and
   a controller module starting a back-off timer in response to adding a Public Land Mobile Network (PLMN) identity to a forbidden PLMN list or in response to setting a subscriber identity card coupled to the mobile communication device as invalid, and forbidding any access to the service network via the wireless module until the back-off timer expires, wherein the back-off timer is kept running in response to the controller module being switched-off or detaching from the service network via the wireless module before the back-off timer expires, and wherein the controller module further removes the forbidden PLMN list and sets the subscriber identity card as valid in response to the back-off timer being expired.

6. The mobile communication device of claim 5, wherein the forbidden PLMN list is maintained for General Packet Radio Service (GPRS) or non-GPRS services, and the invalidity setting of the subscriber identity card is set for GPRS or non-GPRS services.

7. A mobile communication device, configured for Machine Type Communication (MTC) or configured as a low priority device, comprising:

a wireless module performing wireless transmissions and receptions to and from a service network; and a controller module starting a back-off timer in response to adding a Public Land Mobile Network (PLMN) identity to a forbidden PLMN list or in response to setting a subscriber identity card coupled to the mobile communication device as invalid, forbidding any access to the service network via the wireless module until the back-off timer expires, and not storing the forbidden PLMN list in response to a power-off of the mobile communication device before the back-off timer expires, or storing the forbidden PLMN list in response to a power-off of the mobile communication device before the back-off timer expires and removing the forbidden PLMN list in response to a power-on of the mobile communication device after the power-off, wherein the controller module further removes the forbidden PLMN list and sets the subscriber identity card as valid in response to the back-off timer being expired.

8. The mobile communication device of claim 7, wherein the forbidden PLMN list is maintained for General Packet Radio Service (GPRS) or non-GPRS services, and the invalidity setting of the subscriber identity card is set for GPRS or non-GPRS services.

* * * * *